June 14, 1949. C. W. HEATH 2,473,026
NUT DISH
Filed Aug. 17, 1945

Inventor
CHARLES W. HEATH
By Reynolds & Beach
Attorneys

Patented June 14, 1949

2,473,026

UNITED STATES PATENT OFFICE 2,473,026

NUT DISH

Charles W. Heath, near Seattle, Wash.

Application August 17, 1945, Serial No. 610,925

5 Claims. (Cl. 65—15)

The present invention relates to a nut dish having provision for the reception of shells from cracked nuts. It has long been customary, particularly at festive seasons, to provide a bowl full of nuts within reach of family gatherings, visitors, and so forth, so that any who desire may partake of the nuts, cracking them with the crackers and extracting the meats with the picks usually furnished with such bowls. Always, however, the problem arises of disposing of the shells. It is somewhat unsightly to provide an empty dish for the reception of the shells, and such empty shells also are somewhat unsightly in an open dish, and are liable to be upset. Unless such a dish is provided, however, the shells may be dropped back into the nut dish, so that it becomes eventually a problem to select whole nuts from among the shells. Moreover, the volume of the shells, when the nuts are cracked and the meat removed, exceeds the volume of the original nuts, so that any shell dish or container must have very appreciable capacity to receive the shells.

It is the primary object of this invention to provide a dish which in effect is unitary, which has provision for receiving the shells and concealing them, which has adequate capacity, and which though in appearance unitary may in a preferred form consist of two separable parts, the nut bowl and the shell receiver, which can be readily separated without disturbance of the nuts in the dish nor of the nut cracker and picks, if they be used, to permit emptying of the shells from time to time.

Thus, it is an object of the invention to combine appearance, both from the standpoint of the article per se, and from the standpoint of concealment of the shells, and also utility, in providing for the receipt of an adequate quantity of shells.

It is also an object to provide the customary means for supporting a nut cracker, nut picks, etc., and yet to provide a shell receiver so designed and assembled, with relation to the nut bowl and to the supported nut cracker and nut picks, that the latter will not be in the way when the shells are to be placed within the shell receptacle.

The invention comprises the novel combination of nut bowl and shell receiver, in the arrangement shown in the accompanying drawings, described in this specification, and as defined by the claims which terminate the same.

In the accompanying drawings the invention is shown embodied in a typical, but by no means the only possible form of construction and design.

Figures 2, 3:
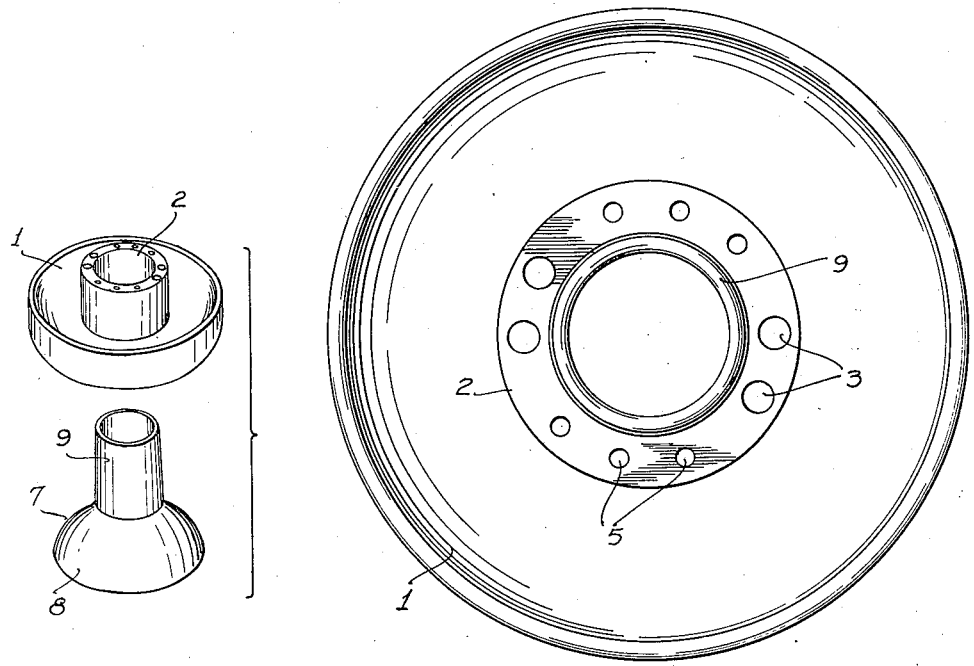
Figure 2 is a plan view of the same.
Figure 3 is an exploded perspective view of the parts.
Figure 1:
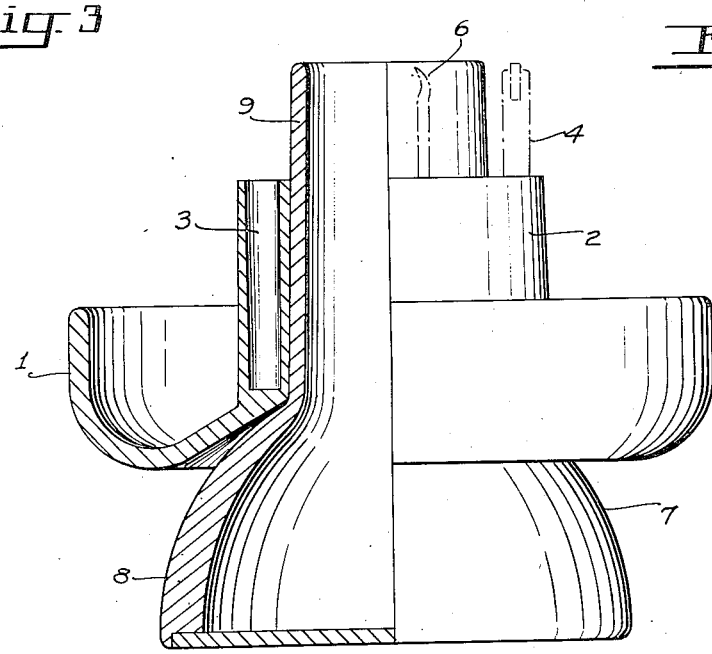
Figure 1 is a half elevation, half axial section, through the combined nut bowl and shell receiver.

The nut bowl consists of a shallow dish 1, of annular trough-shaped form, having a central collar 2 which is preferably elevated somewhat above the level of the peripheral rim of the bowl. Instead of forming the central portion solid, as in the conventional nut bowl, it is axially apertured. The collar may be of sufficient thickness to provide space for sockets 3 for the reception of a nut cracker 4, and sockets 5 which may receive nut picks 6.

The shell receiver comprises a stand, generally designated by the numeral 7, which has a bulbous base or lower portion 8 closed at its bottom and adapted to rest upon the table. The upper portion of the base merges into a reduced hollow stem 9, forming the upper portion of the stand, the base and stem constituting a receiver of appreciable capacity for shells, which are admitted to its hollow interior through the open upper end of its stem.

The annular nut bowl 1 encircles the stem 9 of the stand 7 with slight clearance, and the bottom of the bowl seats upon the upper portion of the stand base 8, as illustrated, so that the stand is the support which rests upon the table and the nut bowl is held elevated above the table. The sockets 3 and 5 should be sufficiently deep, with respect to the height of the protruding nut crackers 4 and picks 6, and with relation to the upper end of the stem 9 when the two parts are assembled, that the picks and nut crackers do not extend above the open upper end of the stem 9. This being the case, the nut crackers and picks, when in place, will not obstruct free access to the open upper end of the stem, and the shells may readily be dropped thereinto. Whenever the hollow stand 7 is filled, or whenever it is desired to empty it, it is only necessary to lift the nut bowl 1 vertically upward off the stand 7, which does not disturb the nuts, and then the shell receiver can be emptied and replaced.

It will be understood that the nut bowl and the stem may each be made of any suitable material. For instance, if the shell receiver is made of a plastic material, and especially if it is designed with a shape which curves inwardly at its bottom, like a vase, it may be necessary to form it of two parts separable at the zone of greatest diameter, and in such a case these two parts may be separable for easier emptying of the shell receptacle. On the other hand, it is a simple matter to empty shells out by inverting the receptacle and pouring or shaking them from the open upper end through which they entered.

In particular it is desired to emphasize that the shell receptacle 7 has a very considerable capacity, sufficient to receive all the shells from a bowl full of nuts. Moreover, these parts may be made up in a variety of designs, of pleasing appearance, and the whole ensemble is compact, of pleasing appearance, and yet extremely useful and convenient for the purpose intended.

An important feature of my combination nut bowl and shell receiver unit is that while its parts appear to be integral when in assembled relationship, the nut bowl may be removed from the shell container for refilling or to be passed from person to person, without disturbing the shell receiver, which remains stable and is in condition to receive nut shells through its stem whether or not the nut bowl is in place. When the nut bowl has thus been removed from the shell receiver, however, the shells contained in it are not exposed to present an unsightly appearance.

An especially desirable feature of the nut bowl is the flared conformation of the lower end of its central aperture. A zone of substantial width encircling the upper portion of the shell receptacle base at its junction with the stem is tapered downwardly and outwardly complementally to such flared portion of the nut bowl. Engagement of these inclined annular surfaces effects a centering wedging contact between the nut bowl and the upper portion of the shell receptacle base 8, so that the nut bowl will seat firmly even though there may be appreciable clearance between its collar 2 and the stem 9 of the shell receptacle. Of perhaps equal importance, the flared entrance to the lower end of the nut bowl aperture serves as a locating guide, which enables such aperture to be aligned very readily with the upper end of the shell container stem 9 when the nut bowl is being replaced upon the shell receptacle. Such ease of assembly eliminates all tendency for the parts of the unit to be utilized as separate articles, which would occupy substantially twice the table area required for the assembled unit.

I claim as my invention:

1. A nut dish comprising a central stand having a hollow bulbous lower portion open over substantially the full breadth of its bottom, a removable cover normally closing such bottom opening, and a relatively slender upper hollow stem admitting to the lower portion, and open at its top for reception of shells, and a relatively shallow separable annular nut bowl having a central collar embracing said stem and resting upon said bulbous lower portion, and means carried by said collar for the positioning and support of nut crackers, nut picks, and the like.

2. A nut dish comprising a central stand having a hollow bulbous lower portion closed at its bottom, and a relatively slender upper hollow stem admitting to the lower portion, and open at its top for reception of shells, and a relatively shallow separable annular nut bowl having a central collar closely embracing said stem and upstanding above the peripheral rim of the bowl, said collar being vertically socketed for the reception of nut crackers, nut picks, and the like.

3. A nut dish comprising a stand having a hollow bulbous base closed at its bottom, and a relatively slender central hollow stem projecting upward from said base and admitting to the interior thereof, and open at its top for reception of shells, and a relatively shallow separable annular nut bowl having a central collar closely embracing said stand stem and upstanding above the peripheral rim of the nut bowl, said collar being vertically socketed for the reception of nut crackers or nut picks and the stand stem extending upwardly a substantial distance above said nut bowl collar, to locate the upper end of the stand stem at least as high as the upper end of such nut crackers or nut picks received in the nut bowl collar sockets.

4. A nut dish comprising a stand having a hollow bulbous base and a relatively slender central upper stem merging exteriorly in an annular downwardly and outwardly tapered zone of substantial width, said stem being open at its top for reception of shells and admitting to the interior of said base, and a relatively shallow nut bowl formed with a collar embracing said base stem, upstanding above the peripheral rim of the bowl, and defining an aperture extending through the nut bowl slightly larger than said stand's stem, flared at its lower end to a degree generally complemental to such tapered annular zone of said stand, such flared portion of the central nut bowl aperture seating upon said tapered zone of said stand when said nut bowl is disposed in position encircling the stem of said stand, to support said nut bowl in a stable manner upon said stand, said nut bowl collar being vertically socketed for the reception of nut crackers or nut picks, and the base stem extending upwardly a substantial distance above said nut bowl collar, to locate the upper stem end at least as high as the upper end of nut crackers or nut picks received in the nut bowl collar sockets.

5. A nut dish comprising a stand portion and a bowl portion, said stand portion including a bulbous hollow base of sufficient breadth to constitute a firm support, and a hollow stem open at its upper end and communicating as a chute with the interior of said base for the reception of nut shells, and said bowl portion encircling said base portion and lying at a level below the upper end of said stem, said bowl portion also including a collar adjacent said stem, socketed vertically to receive implements such as nut crackers, nut picks, or the like, and the stem extending sufficiently high to lie not lower than the upper end of implements so supported.

CHARLES W. HEATH.

REFERENCES CITED

The following references are of record in the file of this patent:

UNITED STATES PATENTS

| Number | Name | Date |
|---|---|---|
| 96,144 | Putnam | Oct. 26, 1869 |
| 117,965 | Barrie | Aug. 15, 1871 |
| 119,086 | Gibson, Jr. | Sept. 19, 1871 |
| 362,413 | Atterbury | May 3, 1887 |
| 496,013 | Snow, Jr. | Apr. 25, 1893 |
| 616,013 | Robertson | Dec. 13, 1898 |
| 821,545 | Simms | May 22, 1906 |
| 965,188 | Humphrey | July 26, 1910 |
| 1,185,026 | Urner | May 30, 1916 |
| 1,234,507 | Sweers | July 24, 1917 |
| 1,277,200 | Davis | Aug. 27, 1918 |
| 1,614,338 | Awoki | Jan. 11, 1927 |
| 1,945,995 | Quackenbush | Feb. 6, 1934 |
| 2,056,943 | Lehman | Oct. 13, 1936 |
| 2,240,842 | Gehring et al. | May 6, 1941 |
| 2,322,665 | Ryan | June 22, 1943 |